US005892456A

United States Patent [19]

Ishida

[11] Patent Number: 5,892,456

[45] Date of Patent: Apr. 6, 1999

[54] INDEX MANAGING METHOD AND APPARATUS OF RECEIVED MESSAGES FOR A RADIO PAGING RECEIVER

[75] Inventor: Hiromichi Ishida, Kakegawa, Japan

[73] Assignee: NEC Corporation, Tokyo, Japan

[21] Appl. No.: 962,336

[22] Filed: Oct. 31, 1997

[30] Foreign Application Priority Data

Oct. 31, 1996 [JP] Japan .................................... 8-290283

[51] Int. Cl.[6] ....................................................... H04B 7/00

[52] U.S. Cl. ................................ 340/825.44; 340/825.47; 340/825.22; 340/825.26; 340/825.27; 370/310; 370/313; 455/38.1; 455/38.2

[58] Field of Search ......................... 340/825.44, 825.47, 340/825.26, 825.27, 311.1, 825.22; 455/38.2; 370/310, 313

[56] References Cited

U.S. PATENT DOCUMENTS 4,642,632 2/1987 Ohyagi et al. ...................... 340/825.44
5,555,446 9/1996 Jasinski .................................. 455/54.2
5,719,562 2/1998 Fawcett .............................. 340/825.44

FOREIGN PATENT DOCUMENTS 4-257127 9/1992 Japan .

*Primary Examiner*—Brian Zimmerman
*Assistant Examiner*—Yonel Beaulieu
*Attorney, Agent, or Firm*—Sughrue, Mion, Zinn, Macpeak & Seas, PLLC

[57] ABSTRACT

Each radio paging receiver includes an originating party identification table in which an individual originating party code provided for each information supplier and a name of the information supplier are registered, a received message memory into which a message received is stored using an identification symbol of a paging number and an originating party code as keys, an index table for systematically indicating storage regions of messages received from any of the information suppliers registered in the originating party identification table using the name of the information supplier as an index name, and a message display unit for displaying, when a message is received or is to be read out, if the message has an index name provided thereto, the message with the index name added thereto. The radio paging receiver generates and adds an index name to information of each message received from an information supplier, and refers, upon reading out of a message, to the index table to retrieve a desired message.

4 Claims, 6 Drawing Sheets

FIG. 2
PRIOR ART
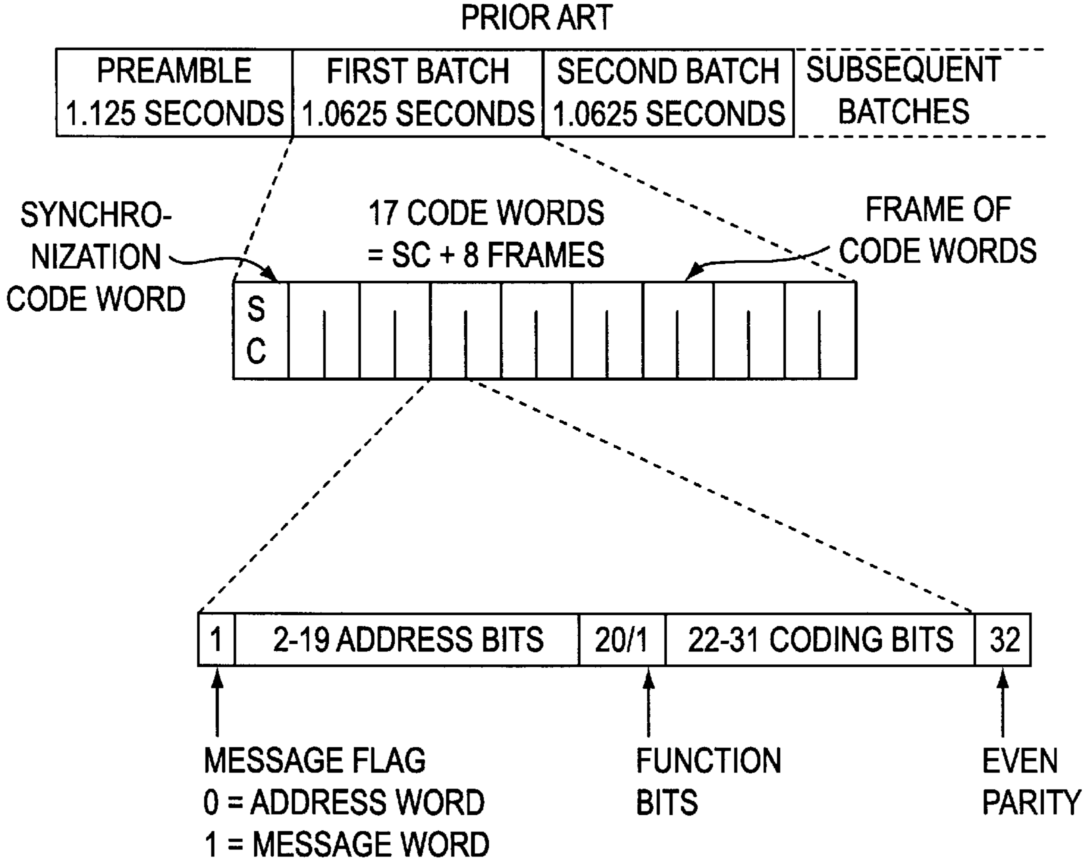
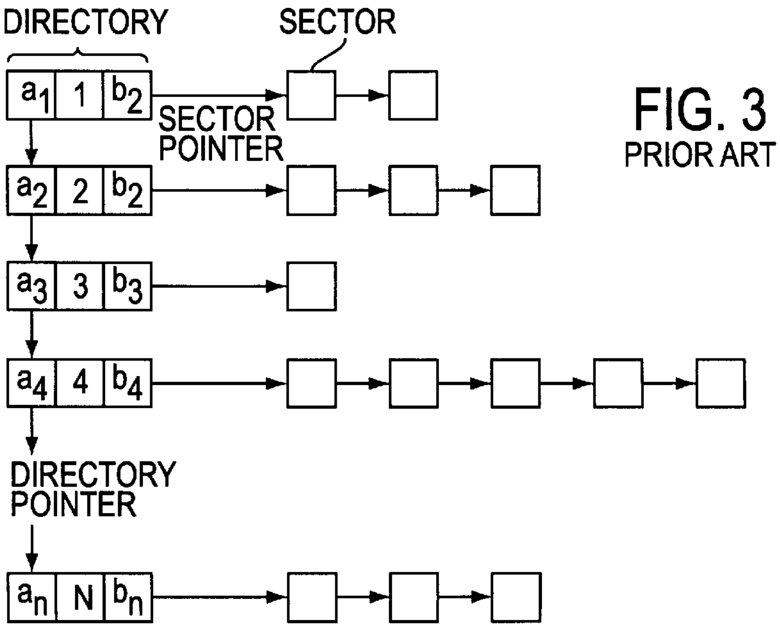
FIG. 3
PRIOR ART

FIG. 5

7-1

| DIAL NO. | CODE | INFORMATION SUPPLIER |
|---|---|---|
| 1H | * 1 | SATO_CO |
| 1H | * 2 | TANAKA |
| 2H | * 3 | A - BROKER |
| | | |
| | | |

FIG. 6

7-2

| MESSAGE NO. | DIAL NO. | CODE | MESSAGE |
|---|---|---|---|
| 1 | 3H | * 4 | XXXXXX....... |
| 2 | 1H | * 1 | YYYYYY....... |
| 3 | 2H | | ZZZZZZ....... |
| | | | |

FIG. 7

7-3

| POINTER TO NEXT INDEX | DIAL NO. | CODE | POINTER (HEAD ADDRESS) |
|---|---|---|---|
| Pb | 1H | *2 | Pa |
| Pb | 1H | *1 | Pc |
| Pd | 3H | *4 | |
| | | | |

INDEX MANAGING METHOD AND APPARATUS OF RECEIVED MESSAGES FOR A RADIO PAGING RECEIVER

BACKGROUND OF THE INVENTION

1. Field of the Invention

This invention relates to a radio paging receiver which can display received message information with numerals or characters, and more particularly to an index managing method and apparatus for received messages for a radio paging receiver which has a plurality of paging numbers.

2. Description of the Related Art

A conventional radio paging receiver which can display a message indicates, when a simple paging signal is received, by means of the sound of a loudspeaker, a lamp or the like that a call has been received. However, when message information is received, the radio paging receiver together with indicating the reception, displays the received message information with characters such as alphanumeric characters on a liquid crystal display unit (LCD) once and then successively stores and accumulates the message information into a built-in memory so that the message successively stored in the memory may be read out and displayed later with characters such as alphanumeric characters on the LCD in response to an operation of a user.

Further, information services by such radio paging receivers as described above have spread recently, and it has become possible to provide a plurality of N paging numbers to one paging receiver so that a plurality of information services can be received by the one radio paging receiver in such a way that stock price information is received with a certain paging number whereas exchange rate information is received with another paging number. A radio paging receiver having a plurality of call numbers provided thereto in this manner has call numbers different for the individual information services, and when messages are to be displayed, identification information for each call number, for example, 1, 2, 3, . . . , or the like, is displayed for each message.

However, the displaying order of messages relies only upon the time series receiving order of the messages stored in the memory completely irrespective of the types of the information services mentioned above, that is, the call numbers.

Thus, another paging receiver has been disclosed in Japanese Patent Laid-Open Application No. JP4-257127/1992 wherein messages stored in a memory are sorted using identification information corresponding to a call number as a key to produce a directory and, when each message is to be displayed on a display unit, a user will refer to the directory to select the required message so that the selected message is displayed.

In particular, the radio paging receiver of the document mentioned above includes, as shown in FIG. 1, an antenna 1, a radio unit 2 which intermittently performs a receiving operation, a decoder 3 for detecting a paging number destined for the self paging receiver and a message from a received signal, a liquid crystal display unit (LCD) 5 for displaying received messages, an EEPROM 6 in which a plurality of N paging numbers provided as paging numbers to the paging receiver are stored, a RAM 7 into which messages, information types and so forth are stored, a notifying apparatus such as a loudspeaker 10 and a driver 9 for the notifying apparatus, and a microprocessor (MPU) 4 for controlling operation of the components.

An information supplier who tries to send a message to the paging receiver will dial a particular paging number from a push-button telephone set of a public communication network or the like and then transmit message information with a push signal.

The paging signal passes through the public network and a paging center office and is converted into an address signal, which is a receiver identification number in a radio section, by a radio base station. Then, the address signal is modulated into a burst signal for the radio section together with a message signal and transmitted all at once.

Several kinds of standards have been established as the format of burst signals transmitted from each radio base station, and as an example, a signal format of the CCIR Radio Paging Code No. 1 or POCSAG is illustrated in FIG. 2.

Each burst signal includes a preamble of 1.125 seconds and a plurality of succeeding batches each of 1.0625 seconds and is transmitted in a FSK modulated state. Each batch includes 17 code words, and the first code word is a synchronization code word (SC). Each of the remaining 16 code words is composed of a total of 32 bits, the first bit indicating whether or not the code words are address words or message words, 20 bits representing addresses or information, a BCH code of 10 bits for allowing error detection and correction, and the last bit a parity bit. Further, the 16 code words are divided into 8 frames each including 2 code words, and each individual pager is called with a particular one of the 8 frames.

Each paging receiver receiving a radio signal compares, by the decoder 3, the address signal (20 bits) demodulated by the radio unit 2 with N paging numbers (each formed from 20 bits) stored in the EEPROM 6. When the received address signal coincides with one of the paging numbers, the paging receiver sends to the MPU 4 a paging number detection flag signal indicating that the receiver has been called and an identification symbol notifying the CPU which one of the paging numbers set for each receiver the call is for (it is). The identification symbols of the paging numbers are determined for each receiver with an arbitrary number of bits and in an arbitrary order so that N paging numbers provided for each receiver may be distinguished with a number of bits smaller than the paging numbers (each formed from 20 bits), and serve also as identification codes showing by type the information services that can be received by each receiver.

After the decoder 3 sends the paging number detection flag signal and the call number identification symbol to the MPU 4, it performs error correction of the message information data sent successively to the paging number and sends only the information bits, one code word at a time to the MPU 4.

The MPU 4 stores the call number identification symbol sent thereto from the decoder 3 into a memory region of the RAM 7, discriminates whether the code words sent successively from the decoder are message information or a paging code, and if the code words are a paging code, stops reception of data at that time. On the other hand, if the code words are message information, the MPU 4 stores the code words into the memory region of the RAM 7. Then, the MPU 4 converts data, which have been stored in the memory, into messages of character data and stores the messages into a message region in the RAM 7. In this instance, if the message region has a message or messages already stored therein, the MPU 4 performs sorting of the message or messages together with the new message based on the call number identification symbols.

After the receiving processing of the message signal is completed, the MPU 4 drives the notifying unit such as a loudspeaker, a light emitting diode LED or the like by the driver 9 to notify the user carrying the apparatus that a call has been received, and displays the contents of the received message on the liquid crystal display unit LCD 5.

The messages stored in the RAM 7 can be read out and displayed, after each has been displayed once upon reception, at any time in response to an operation of a user.

Next, a method of managing messages, characteristic of the present conventional example, is described.

In the message region of RAM 7, a data region of a length for a fixed number of characters is allotted to each page number as a sector on a one sector-one message basis.

The data processing method is variable by message length, and when a message exceeds the number of characters for one sector, sectors are added one at a time and pointers attached, pointing form the front sector to the next sector.

Pointers showing the address of the head sector of each message are attached for the respective fixed addresses.

A table of pointers for showing the addresses of head sectors is called an index table or a directory and each message is managed by this index table or directory, as shown in FIG. 3, a directory is constituted from pointer (a) pointing the next directory, identification symbol N and pointer (b) pointing to the head sector. When a new message is to be stored, a call number identification symbol n of the directory and a call number identification symbol n' of the new message to be stored are compared with each other beginning at the head of the directory, and the directory of the new message is inserted in front of the message which they coincides with both of them, producing pointers to update the directory.

A desired one of the messages stored in the RAM 7 can be displayed on the LCD at any time by the user calling the directory by an operation of a switch button or the like. The message displayed in this instance is read out from the RAM 7 in accordance with the order sorted with the identification symbols of the paging numbers.

However, while the conventional system described above can classify received messages for individual paging numbers, that is, for individual types of information services, when messages destined for one paging number are received from a plurality of information suppliers of the same category, those messages are still displayed the order of reception. Consequently, the conventional system has a problem in that much time is required to retrieve and display a desired message from an information supplier.

SUMMARY OF THE INVENTION

It is an object of the present invention to eliminate the problems of the conventional system described above, by providing an index managing method and apparatus for received messages for a radio paging receiver in which, an index table of received messages is produced, systematized for individual information suppliers so that necessary information can be retrieved and displayed readily.

In order to attain the object described above, in an index managing method of the present invention, an individual originating party code is provided to each information supplier in advance and the originating party codes and names of the information suppliers are registered in an originating party identification table provided for each radio paging receiver, and any of the information suppliers to which the originating party codes are provided originates, based on a designated paging number, message information to which the originating party code is added, and then any of the radio paging receivers which detects a radio signal destined for the radio paging receiver first discriminates, whether data of the received radio signal is a paging code or message information, and when it is discriminated that the data is message information, sorts a received message memory using an identification symbol corresponding to the paging number as a key, retrieves the originating party identification table using an originating party code obtained by decoding of the received radio signal as a key, sets the registered name of the one of the information suppliers which corresponds to the received originating party code as an index name of the received message information, retrieves an index table with the set index name and registers the index name into the index table with pointer information added thereto, stores an identification symbol corresponding to the paging number of the received message information, the message information and data of the name of the information supplier into the received message memory, and displays the received message information on a display unit together with the index name set therefore.

An index managing apparatus of received messages for a radio paging receiver of the present invention comprises an originating party identification table in which an individual originating party code provided for each information supplier and a name of the information supplier are registered in advance, a received message memory into which a message received from any of the information suppliers registered in the originating party identification table is stored using an identification symbol corresponding to a paging number and an originating party code as keys, and an index table for systematically indicating addresses of storage regions of messages received from the information suppliers using the names of the information suppliers registered in the originating party identification table as index names, and is provided in each radio paging receivers.

The above and other objects, features and advantages of the present invention will become apparent from the following description referring to the accompanying drawings which illustrate an example of a preferred embodiment of the present invention.

BRIEF DESCRIPTION OF THE DRAWINGS

FIG. 2 is a diagrammatic view illustrating an example of a format of a burst signal transmitted from each base station;

FIG. 3 is a diagrammatic view illustrating a conventional index constructing method of received messages;

FIG. 5 is a view showing an example of an originating party identification table 7-1A;

FIG. 6 is a view showing an example of a received message memory 7-2;

FIG. 7 is a view showing an example of an index table 7-3;

DETAILED DESCRIPTION OF THE PREFERRED EMBODIMENTS

Figure 1:
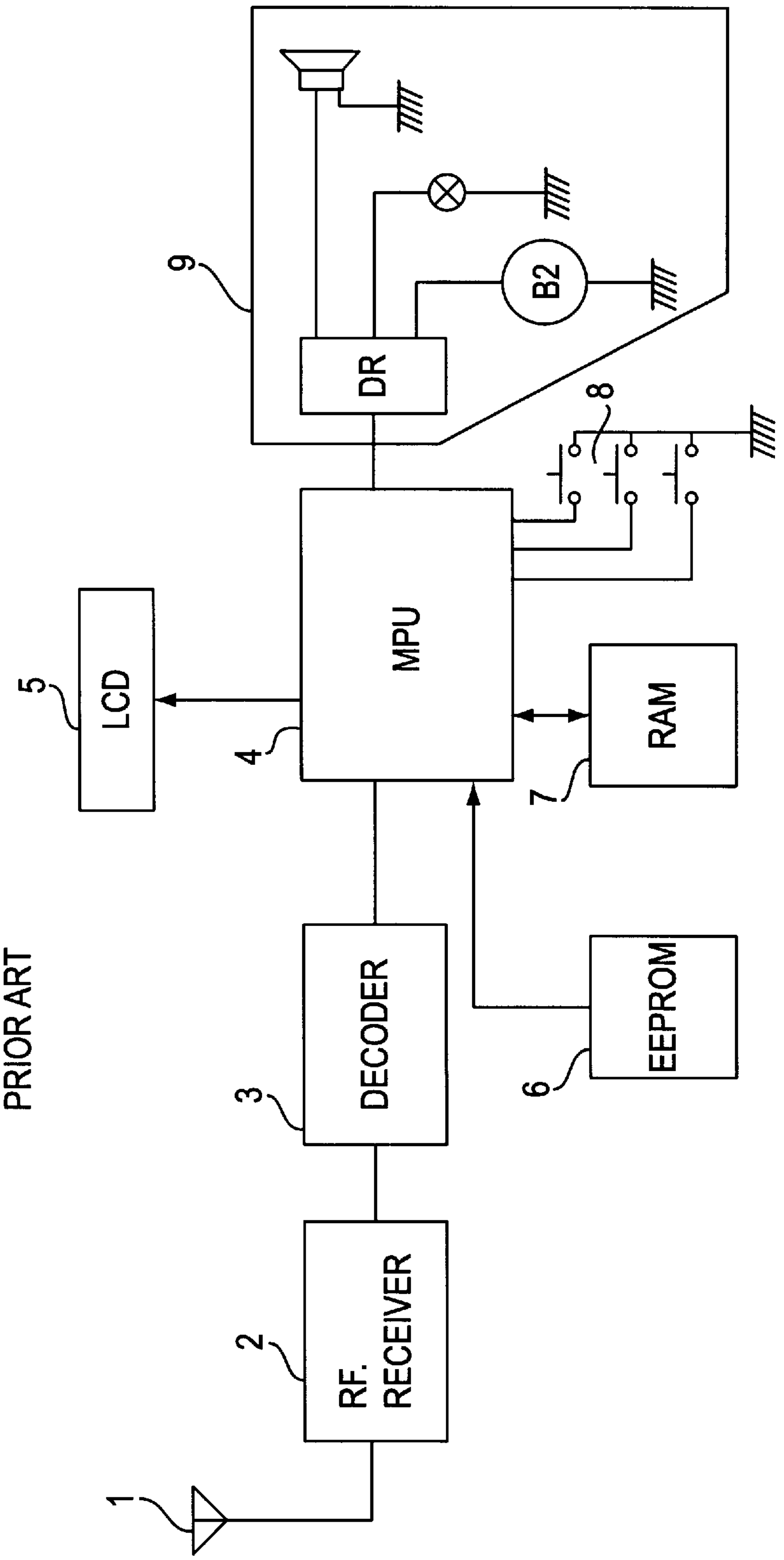
FIG. 1 PRIOR ART
FIG. 1 is a block diagram showing a construction of an example of a conventional paging receiver.
Figure 4:
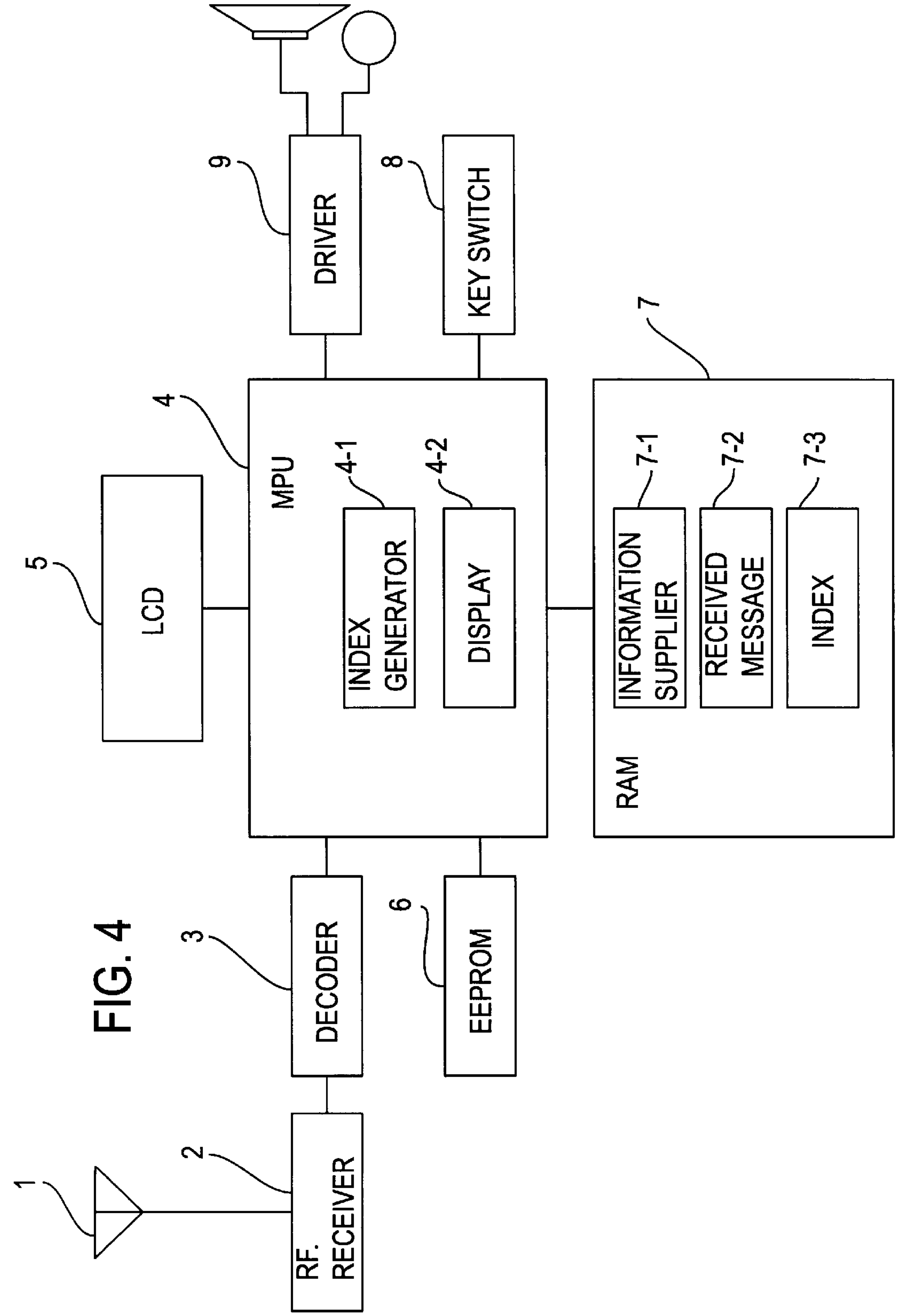
FIG. 4 is a block diagram showing a construction of an embodiment of a radio paging receiver of the present invention.

Referring to FIG. 4 which shows a construction of a radio paging receiver of an embodiment of the present invention, elements having functions similar to those of the conventional example of FIG. 1 are denoted by same reference symbols.

The radio paging receiver of the present embodiment includes an antenna 1 and a radio receiving unit 2 for receiving radio waves, an EEPROM 6 in which a plurality of N paging numbers provided to the radio paging receiver are stored, a decoder 3 for comparing a paging number received and the paging numbers stored in the EEPROM 6 to detect a call destined for the self radio paging receiver, a RAM 7 for storing received messages and various tables therein, a key inputting unit 8 for inputting various instructions and data to the radio paging receiver, a character display unit 5 of an LCD for displaying data with characters and symbols, a call display unit 9 for displaying a call signal by sound or the like, and a control unit 4 for controlling operation of the components.

The RAM 7 in the present embodiment includes an received message memory 7-2 into which an identification symbol of a paging number of received message information, an originating party code and contents of information of the message are stored, an originating party identification table 7-1A in which originating party codes provided for individual information suppliers and names of the-information suppliers are stored in advance, and an index table 7-3 for indicating a storage region of a received message from an information supplier with an information supplier name registered therein.

The control unit 4 includes an index generator 4-1 for sorting the message information stored in the received message memory region 7-2 using an identification symbol of a paging number and an originating party code as keys to generate an index name of the received message information, and a display element 4-2 for referring to the index table 7-3 in response to an instruction from the key inputting unit 8 to display, on the LCD, information of each message adding a name of the corresponding information supplier.

The originating party codes provided to the individual information suppliers are represented, for example, by *1, *2, . . . , and so forth and have been notified in advance to the individual information suppliers together with the paging numbers.

For the names of the individual information suppliers to be stored in the originating party identification table 7-1A, not only alphanumeric characters, but also characters of arbitrary fonts, symbols and so forth can be used.

For a paging number to be stored into the received message memory region 7-2, a decoded paging number of 20 bits need not be used as is, but it may be compressed to a suitable number of bits such as 4 bits to convert it into a numeral ranging from 1 to N so as to correspond to one of the paging numbers.

On the other hand, a message received from an originating party not registered in the originating party identification table is stored into the received message memory region 7-2 with a blank or a dummy originating party code added thereto, but is not registered into the index table 7-3.

Figure 8:
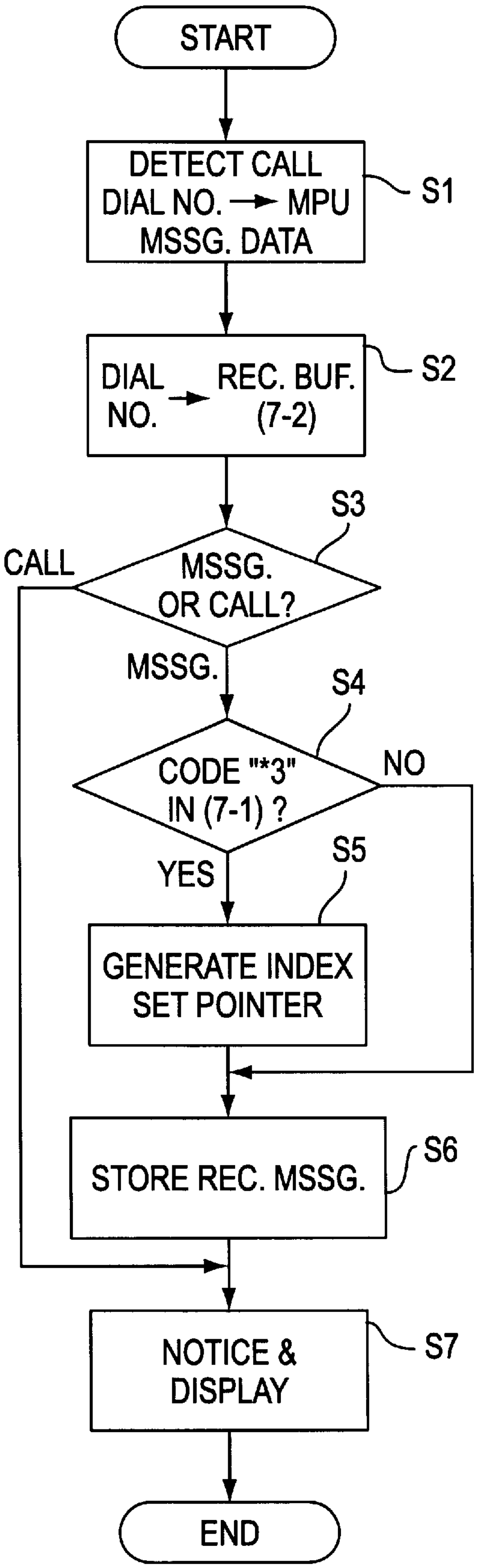
FIG. 8 is a flow chart illustrating an example of a flow of operation upon reception of a message according to an index managing method of the present invention.

Next, operation of the present embodiment upon reception is described with reference to FIG. 8.

An information supplier who wants to send information of the radio paging receiver will dial a designated paging number and then transmit message information adding an originating party code, for example, '*3', to the head of the message information. Following signal transmission processing through the public communication network and the radio base station until the information arrives at the radio paging receiver is performed in a quite similar manner as in the conventional system.

The radio paging receiver sends, when it is detected by the decoder 3 that a paging number (formed from 20 bits) in a received signal demodulated by the radio receiving unit 2 coincides with one of the N paging numbers (each of 20 bits) set in the EEPROM 6, a signal of call detection and a number of one of 1 to N, for example, '4', of the call number identification symbol showing which one of the N paging numbers has been called, to the control unit 4. Further, the decoder 3 performs error correction for BCH code data received following the paging number and transfers only information bits of the BCH code data in units of one code word to the control unit 4 (step S1).

The control unit 4 stores, when the call detection is notified from the decoder 3, '4' of the call number identification symbol into the received message memory 7-2 of the RAM 7 (S2) and then discriminates whether data to be transferred next is message information or a paging code (S3). When a result of the discrimination proves that the data only includes a paging code and does not include message information, the notifying apparatus such as a loudspeaker is driven to notify the call by sound or the like as in the prior art (S8).

When it is discriminated that the data is message information, the control unit 4 detects the originating party code '*3' added to the head of the message information and then discriminates whether or not the originating party code '*3' is registered in the originating party identification table region 7-1A (S4). If the originating party code is registered, then the control unit 4 adds a pointer such as a head address of a storage region using the registered name of the corresponding information supplier as an index-name of the received message information to update the index table 7-3 (S5), and stores the received message information into the received message memory 7-2 (S6). If the originating party code is not registered, then the message information is stored into the received message memory 7-2 while leaving the place for an originating party code blank or inserting a dummy code into the place (S6), but updating of the index table 7-3 is not performed. In this instance, the received message memory 7-2 is sorted with the paging number identification symbol.

After the received message is stored into the received message memory 7-2, the control unit 4 drives the call display element 9 to notify reception of a message to the user and displays the contents of the received message on the LCD 5 (S7).

This display is reset in response to an operation of the user or as a result of time-out, and an initial state in which next reception or instruction of the user is waited is restored.

Figure 9:
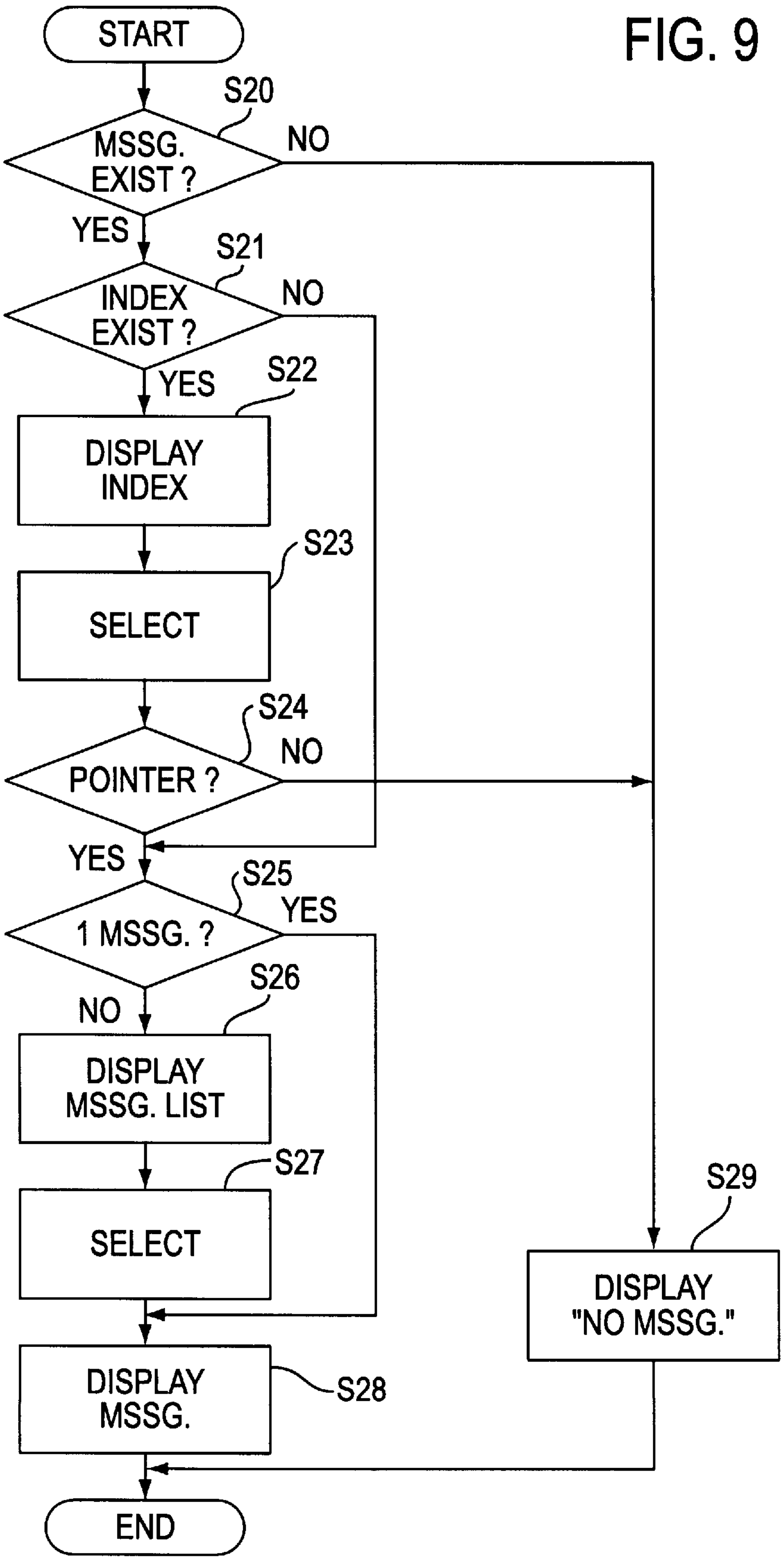
FIG. 9 is a flow chart illustrating an example of a flow of operation upon reading out of stored messages according to the index managing method of the present invention.

Next, reading out of messages stored in the received message memory 7-2 is described with reference to FIG. 9.

If an instruction to read out a message is inputted, then it is first discriminated whether not the received message memory 7-2 has a message or messages stored therein (S20), and if no message is stored, then "no message" is displayed (S29).

If a stored message or messages are present, then the index table 7-3 is retrieved next (S21). If the index table 7-3 is empty and includes no index name, then it is discriminated whether the number of stored messages is 1 or a plural number (S25). However, if an index or indices are present, then the index list is displayed (S22).

If the user looking at the index list displayed inputs a desired index name (S23), it is discriminated whether or not there is a pointer in a hierarchy of the designated index name, and if there is no pointer, then "no message" is displayed (S29). However, even if presence of a message or messages is discriminated, if the number of such messages is only one, then contents of the message are displayed immediately on the LCD 5 (S28).

When a plurality of messages are present, only head portions of the contents of the individual messages are displayed so that a plurality of them may be observed at a glance (S26), waiting for a particular the message to be displayed. Then, detailed contents of a message selected are displayed (S28).

In this manner, the present invention provides an effect in that a necessary message can be retrieved and extracted readily since indices of received messages are produced and displayed based on names of information suppliers.

It is to be understood that variations and modifications of the "index managing method and apparatus of received messages for a radio paging receiver" disclosed herein will be evident to those skilled in the art. It is intended that all such modifications and variations be included within the scope of the appended claims.

What is claimed is:

1. An index managing method of messages received by a radio paging receiver, comprising the steps of:

providing, for each information supplier, a paging number and an individual originating party code in advance;

registering the originating party codes and names of said each information suppliers into an originating party identification table of corresponding radio paging receivers;

sending out, by one of said information suppliers, the paging number first and then message information to which the originating party code is added;

converting, by a radio base station, the paging number and the message information into a radio signal and transmitting the radio signal;

receiving and decoding the radio signal by each of the radio paging receivers;

discriminating, by a radio paging receiver which detects a radio signal destined for it, whether data of the received radio signal is a paging code or message information;

when it is discriminated that the data is message information, sorting a received message memory using an identification symbol corresponding to the paging number as a key;

retrieving the originating party identification table using said originating party code obtained by decoding of the received radio signal as a key;

setting a registered name of the information supplier which corresponds to the received originating party code as an index name of the received message information;

retrieving an index table with the set index name;

registering the index name into the index table with pointer information added thereto;

storing said identification symbol corresponding to the paging number of the received message information, the message information and data of the name of the information supplier into the received message memory; and displaying the received message information on a display unit with the index name set therefore.

2. An index managing method of messages received as claimed in claim 1, wherein, when an instruction to display the index table is received, registered names of the information suppliers corresponding to the originating party codes and the pertaining message information in the sorted order.

3. An index managing method of messages received as claimed in claim 1, wherein message information which coincides with originating party codes detected by said retrieval is further sorted in the order of reception.

4. An index managing apparatus of received messages for a radio paging receiver, comprising:

an originating party identification table in which an individual originating party code provided for each information supplier and a name of the information supplier are registered in advance and registering means for said originating party identification table;

a received message memory into which a message received from any of the information suppliers registered in said originating party identification table is stored using an identification symbol of a paging number of the received message information and said originating party code as keys and storage means for said received message memory;

an index table for producing systematized indices of messages received from the information suppliers using the names of the information suppliers registered in said originating party identification table as index names and production means for said index table; and message displaying means for displaying, when message information to which said originating party code is added is received, the message information adding an information supplier name registered in said originating party identification table to the message information and displaying the index table in response to an instruction input upon retrieval of said received message memory.

* * * * *